UNITED STATES PATENT OFFICE.

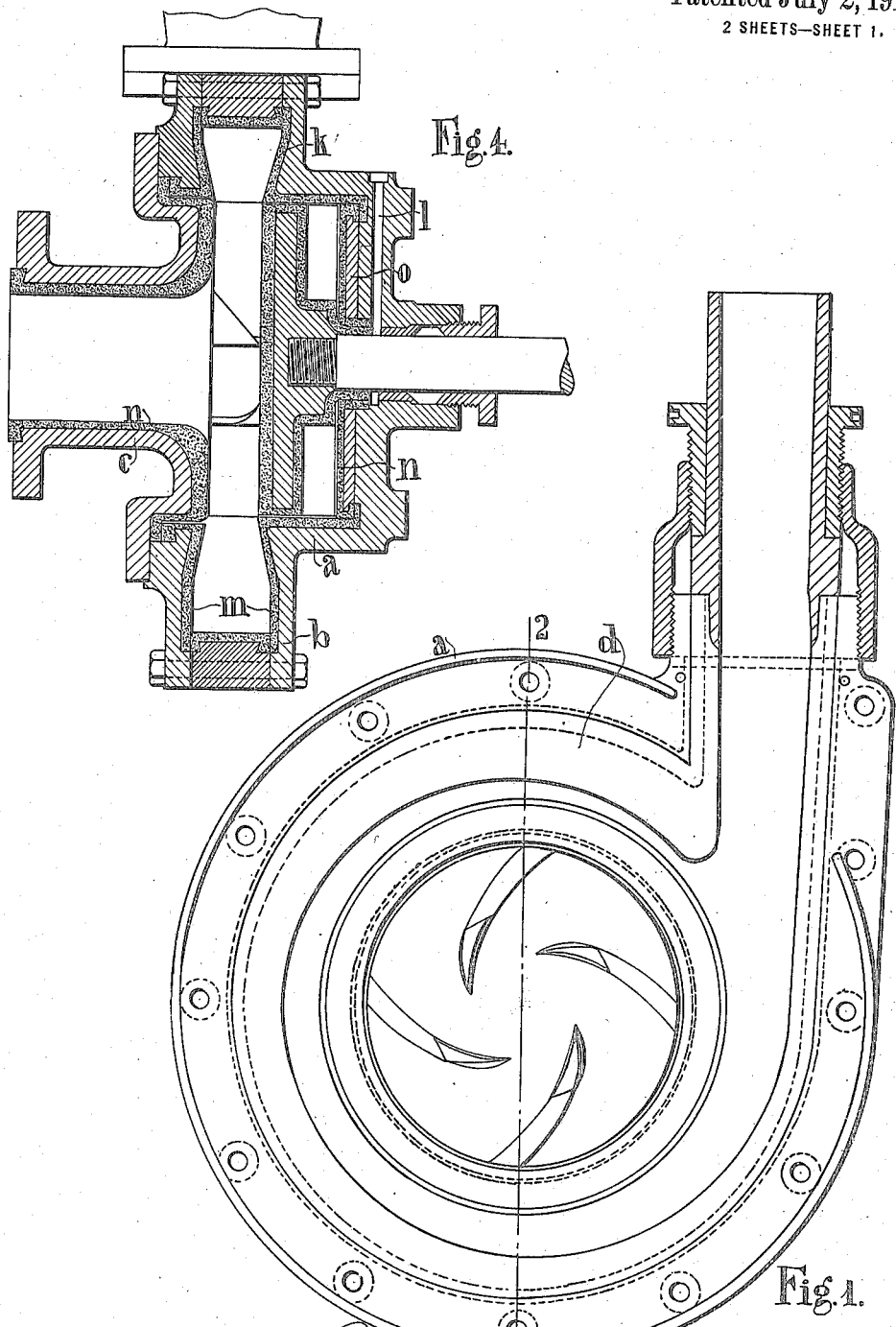

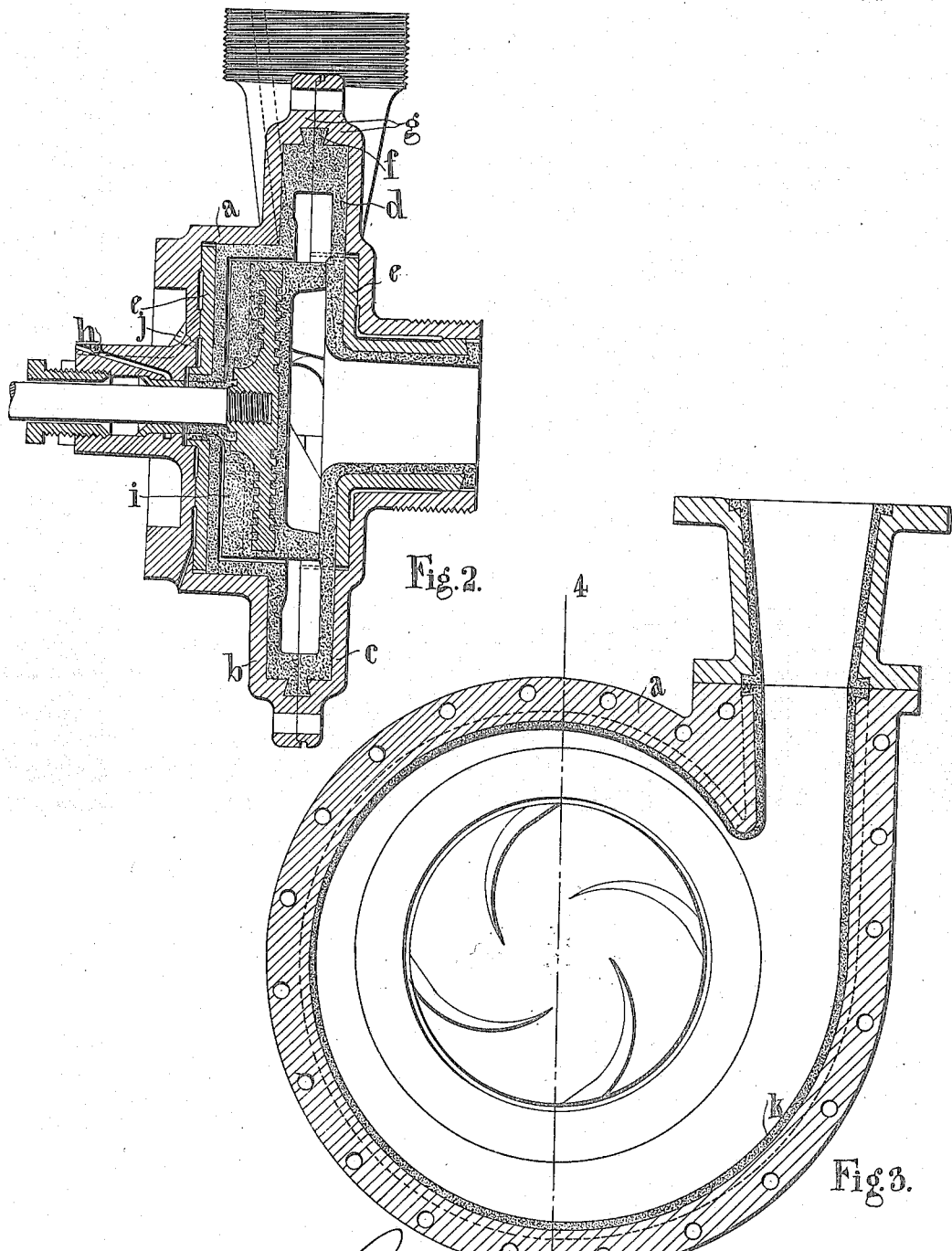

RICHARD CLERE PARSONS, OF LONDON, ENGLAND.

FLUID-PUMP, TURBINE, AND THE LIKE.

1,271,072.  Specification of Letters Patent.  Patented July 2, 1918.

Application filed January 30, 1917. Serial No. 145,531.

*To all whom it may concern:*

Be it known that I, RICHARD CLERE PARSONS, a subject of the King of Great Britain and Ireland, and residing at 39 Victoria street, London, S. W., England, have invented certain new and useful Improvements in and Relating to Fluid-Pumps, Turbines, and the like; of which the following is a specification.

The present invention relates to improvements in centrifugal pumps, turbine type fluid pumps, water turbines and the like.

It has been proposed with a view to prevent abrasion in pumps for pumping slimes and liquids carrying solid matters in suspension to coat the inner surface of the pump chamber, and the impeller, with resilient material.

In such proposals the lining has consisted either of discontinuous pieces of rubber, or of continuous sheets vulcanized on to a rigid metallic backing.

The object of the present invention is to obviate the evils or inconveniences resulting from these methods of construction.

The invention consists in constructing the pump chamber with the metallic portion in the form of a surface of revolution and obtaining the required inner volute form by a packing of rubber or suitable elastic material of varying thickness.

The invention further consists in forming the packing of hard, tough rubber or rubber substitute lined on the exposed surface with soft rubber of good quality.

The invention further consists in constructing a pump chamber in such a manner that the whole of its interior surface is protected by a lining of rubber or like material, the lining being made up of a small number of continuous pieces whose edges are fixed in such a manner that there is no exposed surface of metal.

The invention also consists in clamping the edges of the lining between the separate metallic parts of the casing making up the pump chamber.

The invention also consists in a pump in which the walls of the interior pump chamber and the surfaces of the impeller are protected by a lining of rubber or the like while the pump spindle is protected by a continuously inflowing stream of water preventing abrasive material or corrosive fluid from entering into contact with the spindle.

The invention also consists in the improved construction of pump hereinafter described.

Referring to the accompanying drawings:—

Figure 1 is an elevation of the pump, the front cover being removed, while

Fig. 2 is a section on the line 2—2, Fig. 1.

Fig. 3 is a sectional elevation of another form of pump,

Fig. 4 being a section on the line 4—4, Fig. 3.

In carrying the invention into effect according to the example illustrated in Figs. 1 and 2, the pump casing *a* is constructed of cylindrical form, the two sides being formed by separate castings *b*, *c*, bolted together circumferentially. A rubber lining *d* is molded with an outer circumference of cylindrical form to fit the casing, while its inner surface is of the correct form to give the desired volute figure to the interior of the pump chamber, the radial thickness of the lining being graduated circumferentially for this purpose. The greater part of the lining may be of tough, hard, rubber, or rubber substitute in contact with the metal of the casing. This part should be of a quality sufficiently strong to resist rough usage met with in placing in the casing or in transport, but sufficiently elastic to make close contact with the outer casing under the pressure produced in the pump. The inner surface of the rubber lining which forms the wall of the pump chamber should be of soft rubber of best quality, as I find that such rubber best fulfils the purpose of resisting abrasion.

By constructing the pump in the manner above described, the outer metal casing can be accurately turned to the required dimensions so that it is readily fitted with a spiral inner lining, the replacement of the lining when worn out being thus rendered extremely simple.

It is known that in all surfaces subject to abrasion wear takes place more readily at the junctions of the various parts than where the surface is uniform and continuous, and further, it is desirable that the replacement of all parts subject to wear should be effected as easily as possible, and this is facilitated by constructing the parts of simple figures capable of being accurately reproduced at a minimum of cost.

By means of my invention these results are readily obtained.

I construct the resilient lining to the pump in a small number of continuous pieces, taking care that the edges where the same are unavoidable shall be so disposed as to be removed from the action of the abrasive material passing through the pump. Thus the circumferential edges of the lining $d$, for the front and back walls of the chamber are dovetailed, as shown at $f$ and firmly gripped between the flanges $g$ of the casing.

I preferably prevent abrasion by molding the lining in a soft and highly resilient quality of rubber which I find is the quality best suited for resisting abrasion and by making this lining in such a form that it shall be held in position by clipping the edges tightly between flanges formed in the metal casing to which the lining is applied, so that the joint so formed is watertight and thus the abrasive material is prevented from getting to the edges of the lining.

It is also of importance that the rubber surfaces exposed to abrasive matter shall be in compression so that should a cut in the surface occur it will close of itself.

In order to insure this the rubber linings shall fit tightly into the metallic casings and be so elastic that the internal pressure produced by the working of the pump shall force them tightly against the interior face of the casing. To render this action more certain I may perforate the latter so as to relieve the back of the lining of any pressure greater than that of the atmosphere.

Where any portion of the lining is subject to a variable pressure, such as occurs in passing from the center to the circumference of the impeller, I may stiffen the rubber by vulcanizing it on to iron plates $e$ $e$, Fig. 2; in other cases I employ a backing of harder rubber of a quality such as to stand rough usage but which is at the same time sufficiently elastic to permit of the rubber liner being pressed into the metallic casing and also the filling up of any spaces between said liner and the casing under the pressure before mentioned.

To facilitate the construction of the casing of the pump as well as of the molds in which the rubber lining is vulcanized I make these interiors in the form of surfaces of revolution and I obtain a spiral form in the interior of the pump by thickening the hard rubber backing to the variable extent necessary to give the desired form to the volute chamber of the pump. By this means the outer metal casing can be accurately turned to any desired dimension, the outer face of the rubber lining can be accurately molded to fit the same and the core of the vulcanizing mold can be accurately machined or otherwise shaped to the desired volute form. The construction of the pump is thus greatly facilitated, the replacement of a worn lining rendered extremely simple and at the same time the durability of the lining is made a maximum.

The impeller consists of a metal center inclosed entirely in soft rubber, the blades being composed of the same material and further extended to form the balancing blades on the back $i$, Fig. 2, and is further continued so as to form a sheathing to protect the spindle.

This method of construction is also available as a protection against the action upon the metallic body of a pump and impeller of chemicals, or other liquids of a corrosive nature.

In order to protect the spindle of the pump a continuous stream of water or other liquid of non-injurious character is provided passing into the pump chamber by the passage $j$ and so around the spindle so that any matter of erosive or corrosive character in the liquid to be pumped is prevented from coming in contact with the spindle. These passages I prefer to make as small as possible so that the volume of water required to protect the spindle may be the least possible, so as not only to avoid unnecessary expense in consumption of water, but in the case of the pump being used to pump chemicals there should be the minimum quantity of water added to them.

So as to regulate the quantity of water admitted to the spindle and also to be certain that its flow is continuous, I prefer that it shall be admitted through what is termed a sight feed lubricator.

The bearing is lubricated through a passage in the casing controlled by the screw $h$.

In the form of the invention shown in Figs. 3 and 4, the metallic casing of the pump is made of the correct volute form and the lining $k$ of the volute is of uniform thickness; this lining is molded in one piece and is of the section clearly shown in Figs. 3 and 4. This strip of rubber is molded of such a shape that when it is fitted into its place in the casing its internal surface is in compression.

The outer sides of the pump chamber $m$ are formed of molded rings of rubber to fit tightly into the metal casing so as to be in compression and the central portions of the chamber $n$ are formed of rubber vulcanized to the parts $o$ $o$ and cannot be in a condition having surface tension. Suitable dovetails are provided as shown in Figs. 3 and 4.

When the several portions of the rubber lining are placed in position, the back and front portions of the metal casing are clamped together as clearly shown and a complete rubber lining is formed which is perfectly impervious to the passage of erosive or corrosive matter.

In this modification, as in the previous instance, water is led in by the passage $l$ around the spindle to prevent the passage of grit to the bearings.

Having now described my invention, what I claim as new and desire to secure by Letters Patent is:—

1. A centrifugal pump, turbine type fluid pump, water turbine or the like of the type in which the inner surface of the pump chamber and the impeller are lined with an impervious resilient material, having the metallic portion of the casing constructed as a true surface of revolution, the required inner volute form being obtained by a packing of rubber or suitable elastic material of varying thickness.

2. In a pump as claimed in claim 1, an impervious lining formed with an exposed surface in compression of soft rubber of good quality with a backing of hard, tough, rubber or rubber substitute.

3. A centrifugal pump of the type in which the inner surface of the pump chamber and the impeller are lined with an impervious resilient material, said material being vulcanized to metal plates on the inner surface of the pump chamber in the neighborhood of the pump axis where the pressure is below atmospheric pressure, and the surface of said material being in compression toward the circumference of the pump chamber where the pressure is above atmospheric pressure, as set forth.

In testimony whereof, I have affixed my signature.

RICHARD CLERE PARSONS.